United States Patent
Pope

[11] 3,848,189
[45] Nov. 12, 1974

[54] QUALITATIVE RF OUTPUT-REFLECTED POWER INDICATOR

[76] Inventor: William T. Pope, Rd. 1 Maple Ln., Lee Center, N.Y. 13363

[22] Filed: Mar. 26, 1973

[21] Appl. No.: 345,193

[52] U.S. Cl..................... 324/95, 324/58 R, 324/96
[51] Int. Cl........................ G01r 21/04, G01r 27/02
[58] Field of Search............. 324/95, 96, 133, 57 R, 324/58 R, 58 A, 58 B; 325/67, 363

[56] References Cited
UNITED STATES PATENTS

| | | | |
|---|---|---|---|
| 2,038,277 | 4/1936 | Gent | 324/96 |
| 3,197,696 | 7/1965 | Bibo | 324/95 |
| 3,452,347 | 6/1969 | Stimson | 324/133 |
| 3,626,289 | 12/1971 | Vinson et al | 324/133 |

Primary Examiner—Alfred E. Smith
Assistant Examiner—Ernest F. Karlsen

[57] ABSTRACT

An RF directional coupler comprising an element for insertion into an RF transmission line, or at the transmitter output, with suitable means of extracting a small amount of power into two circuits so as to separate forward moving waves from reflected waves: forward wave (proportional to output power) circuit and reflected wave (proportional to power loss) circuit comprised of suitable distributed capacitance, distributed inductance, terminating resistors, light emitting solid state diodes and harmonic filter.

3 Claims, 1 Drawing Figure

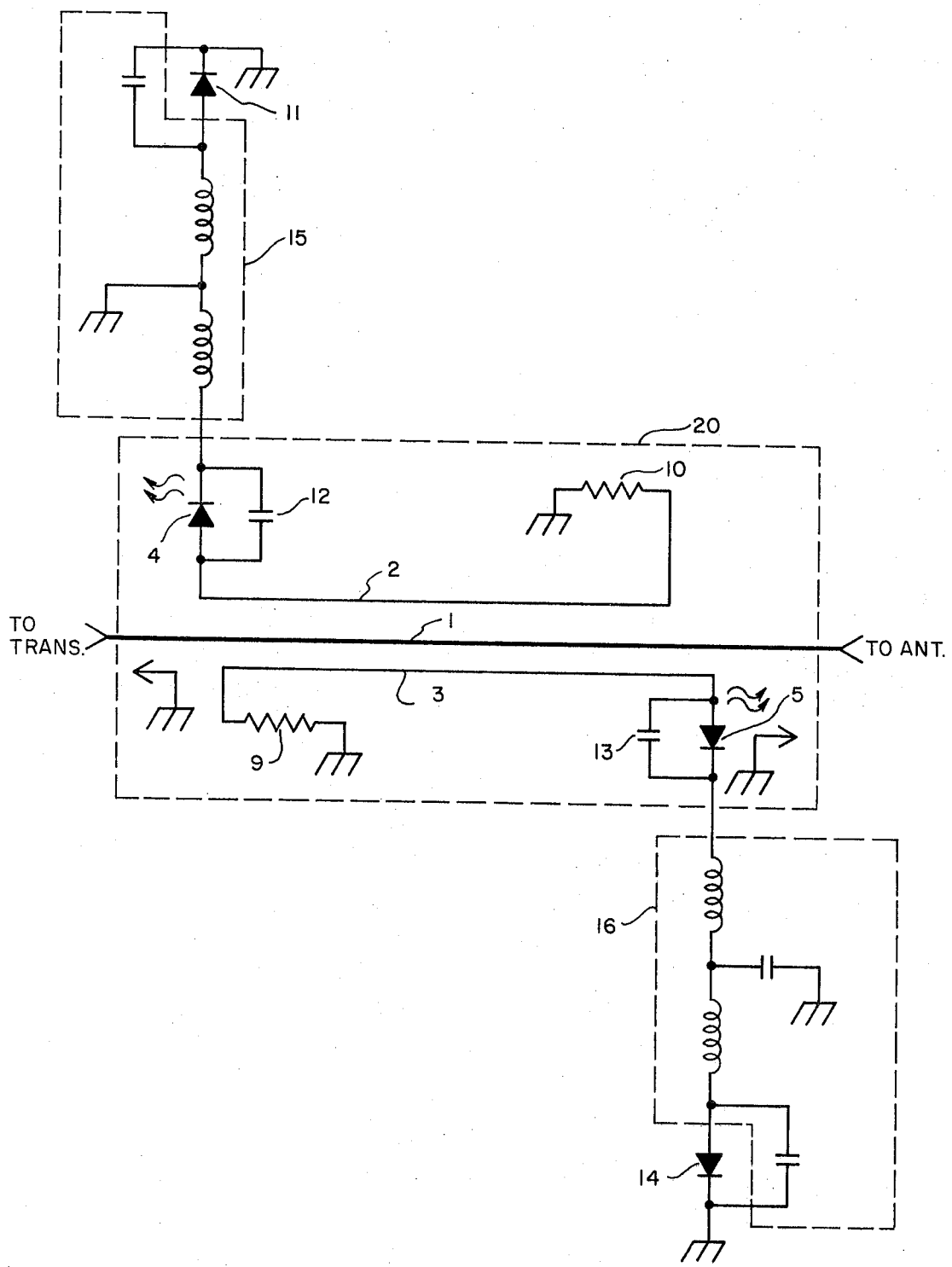

QUALITATIVE RF OUTPUT-REFLECTED POWER INDICATOR

BACKGROUND OF THE INVENTION

This invention relates to RF forward and reflected power indicators for transmitters and transmission lines and more particularly to an RF directional coupler providing simultaneous indication (without mechanical devices, i.e., meters) by a visual light source of extreme high sensitivity. The activation of the light source indicates the presence of forward output power and reflected loss power and its intensity is proportional to power output and reflected loss power respectively.

Indicators in the prior art of the general nature of that to be disclosed hereinafter for forward and reflected power are not completely satisfactory and have many disadvantages. Four of the major deficiencies that have prevented successful operation of prior art indicators in the manner of this invention are the following.

1. Limitations of similar devices employing mechanical meters such as size, weight, shock resistance. This invention employs solid state light emitting diodes weighing on the order of hundredths of an ounce compared with meters weighing typically several ounces. The volume of the solid state diode indicator is on the order of a magnitude or more less than typical meters.

2. Meter indicating devices are typically confusing to the non-technical operator whereas my invention uses indicating lights that are self-powered by a minute amount of coupled RF energy and provide a simple, discrete go, no-go type of indication especially suitable for the non-technical operator.

3. Meter device indicators require separate means of providing visibility under darkness conditions whereas my invention provides its own illumination inherent in the minute RF energy coupled for measurement purposes.

4. Higher cost and greater size of meter devices make it costly and difficult under certain conditions to provide simultaneous forward and reflected power indication this dual indication being an advantage for adjustment and analysis of faulty operation and is easily provided by my invention.

The prior art thus taught the use mainly of meter indicators. If lights were suggested they were of a type requiring excessive operating power for use with moderate power output transmitters typically used in marine, aircraft, citizens band, or amateur VHF, UHF type equipment. As such the prior art devices were relatively inflexible as to location of indicator devices for maximum operator convenience.

SUMMARY OF THE INVENTION

According to the present invention a more efficient combination of RF coupler-indicator device has been devised. This was possible due to the discovery of the desirable impedance and light output characteristics of the light emitting diodes as indicators of forward and reflected power when applied to an RF directional coupler device. The inherent non-linearity, or threshold of ignition characteristic of light emitting diodes, is a distinct advantage when properly coupled and thereby determines the threshold of go, no-go indication for ease of interpretation by both the technical and non-technical type operator.

An object of this invention is to provide a new and improved RF output-reflected power indicator.

Another object of this invention is to provide a radio frequency output-power and reflected-power indicator for transmitters and transmission lines.

Another object of this invention is to provide a simple go, no-go indicator of RF power output and reflected power loss which can be used and easily interpreted by the non-technical as well as the technically qualified operator.

Another object of this invention is to provide an extremely rugged, shock resistant RF power indicator unit.

Still another objective of this invention is to provide an instrument for achieving the desired indication suitable for low power transmitters in the HF, VHF, UHF and microwave range which is self-powered and can be easily viewed and interpreted in darkness without ancillary light sources.

These and further objectives and advantages of this invention will become apparent upon reference to the accompanying specifications, drawing and claims.

BRIEF DESCRIPTION OF THE DRAWINGS

A more complete understanding of the invention and many of the attendant advantages thereof will be readily appreciated as the same become better understood by reference to the following detailed description when considered in connection with the accompanying drawing wherein:

The FIGURE is a schematic diagram of the RF directional coupler and indicator device which is generally, but not necessarily, constructed on strip-line circuit board with all elements and light emitting diodes (LED's) self-contained.

DESCRIPTION OF THE PREFERRED EMBODIMENT

Referring now to the drawings, there is shown generally in the FIGURE, a directional radio-frequency coupler using a printed circuit board (PCB) 20 on which many other components are mounted and to be described hereinafter. A main conductor 1, which may be a strip of foil as in strip-line techniques extends across the PCB in a lineal fashion from the transmitter or the "To Trans." end to the antenna or the "To Ant." end. Proximate and parallel to the main conductor 1 is a first pickup conductor 2 for receiving the forward power signal and a second pickup conductor 3 for receiving the reflected power signal.

Connected to the transmitter end of the first pickup conductor 2 is a light emitting diode (LED) 4 having an RF bypass capacitor 12 connected across it in parallel. A low-pass harmonic filter 15, comprising series connected inductances and shunt capacitances, is connected to the cathode of the LED 4. A rectifying diode 11 is connected to the other end of the filter 15 and to a ground connection. The antenna end of the first pickup conductor is connected through a load resistor 10 to a ground connection.

Substantially in the same manner, but at the antenna end of the second pickup conductor, is connected an LED 5, having an RF bypass capacitor 13 connected in parallel. A low-pass harmonic filter 16, similar to filter 15, is connected to the cathode of LED 5. Another rectifying diode 14 is connected to the other end of filter 16 and to a ground connection. The transmitter end of the second pickup conductor is connected through a load resistor 9 to a ground connection.

Having described the connection of the elements of the invention the operation will now be described. Conductors 1, 2 and 3 are elements of a directional coupler which uses but is not limited to strip-line techniques. The elements are precisely designed in length, size and spacing so that when inserted into the transmission line between transmitter and load, such as an antenna, it does not adversely affect the continuity of impedance of the transmission line. Further the size, length and spacing between Conductors 1, 2 and 3 are such as to sample a precise amount of RF power to operate the light emitting diodes (LED's) 4 and 5 when suitable transmit power and reflected power conditions exist. During operation, incident or forward power voltage exists at point 6 and flows along Conductor 1. Voltage is induced into 2 and exists at point 7 because of distributed inductance and mutual inductance and capacitance coupling causing light emitting diode 4 to light. Voltage from the incident wave flowing in 1 is induced in 3 because of the distributed inductance and mutual inductance and capacitance coupling between 1 and 3. When balanced by proper load and resistor 9 the incident wave voltage induced into 3 will be cancelled at point 8 and therefore light emitting diode 5 will not light on forward power. The same situation holds in reverse in the case of a reflected wave from a mismatched load and proper resistance 10 will cause LED 5 to light but not 4. Diode 11 operates to rectify the voltage existing between point 7 and ground due to incident wave coupled through RF by-pass capacitor 12. The resulting direct current voltage provides proper thresh-old conduction characteristics of LED 4. The same analysis applies to reflected power in the case of LED 5, RF by-pass capacitor 13 and rectifier diode 14. The harmonic filter units 15 and 16 are low-pass filters consisting of series inductance and shunt capacitance and known to those skilled in the art. They are used to eliminate or reduce undesirable higher order harmonics produced by the non-linear action of the rectifying diodes, 11 and 14 which might otherwise radiate to produce spurious interfering signals.

What is claimed is as follows:

1. An RF directional coupler and forward- and reflected-power indicator for radio frequency transmitters and transmission lines comprising:
   a main conductor of RF current of a lineal shape having a transmitter end and an antenna end;
   a first pick-up conductor parallel and proximate and thereby coupled to said main conductor by distributed inductance and capacitance;
   a second pick-up conductor parallel and proximate and thereby coupled to said main conductor by distributed inductance and capacitance;
   a light emitting diode electrically connected to said first pick-up conductor at the transmitter end;
   a load resistor electrically connected to said first pick-up conductor at the antenna end and to a ground connection;
   a light emitting diode electrically connected to said second pick-up conductor at the antenna end;
   a load resistor electrically connected to said second pick-up conductor at the transmitter end and to a ground connection;
   a rectifying diode electrically connected to each of said light emitting diodes and to a ground connection; and
   an RF bypass capacitor electrically connected across each of said light emitting diodes.

2. The RF directional coupler of claim 1 further comprising:
   a low-pass harmonic filter electrically interposed between each of said light emitting diodes and said rectifying diodes.

3. The RF directional coupler of claim 2 further comprising:
   a printed circuit board on which all of said conductors and said components are mounted using strip line techniques.

* * * * *